(12) United States Patent
Dong

(10) Patent No.: US 9,292,451 B2
(45) Date of Patent: Mar. 22, 2016

(54) METHODS AND APPARATUS FOR INTRA-SET WEAR-LEVELING FOR MEMORIES WITH LIMITED WRITE ENDURANCE

(71) Applicant: QUALCOMM Incorporated, San Diego, CA (US)

(72) Inventor: Xiangyu Dong, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/769,965

(22) Filed: Feb. 19, 2013

(65) Prior Publication Data

US 2014/0237191 A1  Aug. 21, 2014

(51) Int. Cl.
*G06F 12/12* (2006.01)
*G06F 12/08* (2006.01)

(52) U.S. Cl.
CPC ........ *G06F 12/0891* (2013.01); *G06F 12/0895* (2013.01); *G06F 12/121* (2013.01); *G06F 2212/1032* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 3,700,865 A | 10/1972 | Ley | |
| 3,772,595 A | 11/1973 | De Wolf et al. | |
| 7,035,967 B2 | 4/2006 | Chang et al. | |
| 7,046,174 B1 | 5/2006 | Lui et al. | |
| 7,568,068 B2 | 7/2009 | Sanvido et al. | |
| 7,797,481 B2 | 9/2010 | Lee et al. | |
| 8,112,574 B2 | 2/2012 | Lee et al. | |
| 8,275,945 B2 | 9/2012 | Tzeng et al. | |
| 2005/0240731 A1* | 10/2005 | Steely, Jr. | 711/133 |
| 2008/0114930 A1* | 5/2008 | Sanvido et al. | 711/113 |
| 2008/0137463 A1 | 6/2008 | Ishikawa | |
| 2008/0228991 A1 | 9/2008 | Ferroussat et al. | |
| 2009/0138654 A1 | 5/2009 | Sutardja | |
| 2009/0168525 A1 | 7/2009 | Olbrich et al. | |
| 2009/0198882 A1 | 8/2009 | Ji et al. | |
| 2010/0115175 A9 | 5/2010 | Zhuang et al. | |
| 2010/0185816 A1 | 7/2010 | Sauber et al. | |
| 2010/0281202 A1 | 11/2010 | Abali et al. | |
| 2011/0316816 A1 | 12/2011 | Okuma et al. | |

(Continued)

OTHER PUBLICATIONS

Qureshi, et al. Enhancing lifetime and security of PCM-based main memory with start-gap wear leveling, Dec. 12, 2009, MICRO 42 Proceedings of the 42nd Annual IEEE/ACM International Symposium on Microarchitecture, pp. 14-23.*

(Continued)

*Primary Examiner* — Adam M Queler
*Assistant Examiner* — Jason Blust
(74) *Attorney, Agent, or Firm* — Muncy, Geissler, Olds & Lowe, P.C.

(57) ABSTRACT

Efficient techniques are described for extending the usable lifetime for memories with limited write endurance. A technique for wear-leveling of caches addresses unbalanced write traffic on cache lines which cause heavily written cache lines to fail much fast than other lines in the cache. A counter is incremented for each write operation to a cache array. A line affected by a current write operation which caused the counter to meet a threshold is evicted from the cache rather than writing data to the affected line. A dynamic adjustment of the threshold can be made depending on the operating program. Updates to a current replacement policy pointer are stopped due to the counter meeting the threshold.

19 Claims, 3 Drawing Sheets

(56) References Cited

U.S. PATENT DOCUMENTS

| | | | |
|---|---|---|---|
| 2012/0131304 A1 | 5/2012 | Franceschini et al. | |
| 2012/0278543 A1 | 11/2012 | Yu et al. | |
| 2012/0311228 A1* | 12/2012 | Hsu et al. | 711/102 |
| 2013/0219328 A1* | 8/2013 | Rosen et al. | 715/781 |
| 2014/0237160 A1 | 8/2014 | Dong | |

OTHER PUBLICATIONS

Liu, et al. PCM-Based Durable Write Cache for Fast Disk I/O, Aug. 7-9, 2012, Modeling, Analysis & Simulation of Computer and Telecommunication Systems (MASCOTS), 2012 IEEE 20th International Symposium, pp. 451-458.*

Xiangyu,"i2WAP: Improving Non-Volatile Cache Lifetime by Reducing Inter- and Intra-Set Write Variations," Feb. 2013, 12 pp.
International Search Report and Written Opinion—PCT/US2014/016993—ISA/EPO—Jun. 4, 2014.
Jadidi A., et al., "High-Endurance and performance-efficient design of hybrid cache architectures through adaptive line replacement," International Symposium on Low Power Electronics and Design (ISLPED), Aug. 1, 2011, pp. 79-84, XP032038792, DOI: 10.1109/ISLPED.2011.5993611, ISBN: 978-1-61284-658-3, Chapter III. Write Management Policies.
Zhou P., et al., "A durable and energy efficient main memory using phase change memory technology," ACM SIGARCH Computer Architecture News, Jun. 15, 2009, vol. 37 (3), pp. 14-23, XP055120565, ISSN: 0163-5964, DOI: 10.1145/1555815.1555759, Chapter 3 Improving the endurance of PCM.

* cited by examiner

METHODS AND APPARATUS FOR INTRA-SET WEAR-LEVELING FOR MEMORIES WITH LIMITED WRITE ENDURANCE

FIELD OF THE DISCLOSURE

The present disclosure relates generally to aspects of processing systems and in particular to methods and apparatus to extend the usable lifetime of memories with limited write endurance.

BACKGROUND

Many portable products, such as cell phones, laptop computers, personal data assistants (PDAs) and the like, utilize a processing system that executes programs, such as communication and multimedia programs. A processing system for such products may include multiple processors, complex memory systems including multi-levels of caches and memory for storing instructions and data, controllers, peripheral devices such as communication interfaces, and fixed function logic blocks configured, for example, on a single chip. At the same time, portable products have a limited energy source in the form of batteries that are often required to support high performance operations by the processing system and increasingly large memory capacities as functionality increases. To improve battery life, it is desirable to perform these operations as efficiently as possible. However, the scaling of common memory platforms, such as static random access memory (SRAM) and embedded dynamic random access memory (eDRAM), is increasingly constrained by leakage power and cell density. Such concerns extend to personal computer products which are also being developed with efficient designs to operate with reduced overall energy consumption.

A number of memory technologies, such as flash memory, magnetorestive random access memory (MRAM), phase change memory (PCM), resistive RAM (ReRAM), and others, have various limits on the number of write operations that can be performed to the device before memory cells begin to wear out and fail. Memories such as caches, which operate based on principles of spatial and temporal locality and at high data rates, show a wide variability in cache line accesses from program to program and may have cells that experience a very high rate of write accesses. For example, set associative caches which have a plurality of sets of data, each set divided in a plurality of selectable cache ways and each way in a set holding a cache line, experience different write access patterns within each set depending on the program in execution. Also, the write access variability from line to line in a set may be very large and may vary dynamically during system operations.

For example, an 8-way set associative 64 kbyte cache may be constructed having 256 sets of eight 32-byte cache lines per set and access one cache line for each way. Such a cache may be used in a level 1 data cache in a portable device, such as a cell phone, tablet, lap top and the like. In the eight way set associative cache for a program X, write access to a line of data in way 2 may occur multiple orders of magnitude more often than write access to a line of data in a different cache way, such as way 7. Thus, the line of memory internal to the cache for way 2 may fail much earlier than the memory line in way 7 and most other lines in the cache having write access rates lower than the write access rates of way 2. The memory wear endurance affects each level of a memory hierarchy, such as level 1, 2, and 3 caches, flash memory, and system memory, though to different degrees in each level and each device. With processors running in the gigahertz (GHz) frequency, caches experience a large number of write accesses which may be to specific lines in the cache and thus such locality of accesses may cause a system to too rapidly approach the write limits of the cache memory. Since any cache line may experience high write operations depending on the program in execution and such a cache line hotspot is not known in advance, the cost for monitoring every cache line to determine which cache line in a cache set is affected and should be relocated to reduce wear may be prohibitive.

SUMMARY

Among its several aspects, the present disclosure recognizes that providing more efficient methods and apparatuses for intra-set wear-leveling extends the usable lifetime of memories with limited write endurance. To such ends, an embodiment of the invention addresses a method for wear-leveling of a cache. A counter is incremented for each write operation to the cache. A line affected by a current write operation which caused the counter to meet a threshold is evicted from the cache. The current write to the line affected by the current write operation is stopped due to the counter meeting the threshold.

Another embodiment addresses an apparatus for wear-leveling a cache. A cache having a plurality of ways is coupled to a processor complex which writes data to the cache. A write threshold circuit and a counter circuit are configured to count write operations to the cache and generate an indication when the counter circuit has reached a threshold based on a comparison in the write threshold circuit. A line flush circuit is configured to evict from the cache a line affected by the current write operation in response to the indication. A replacement policy circuit is configured to stop updates to change a current line replacement policy pointer in response to the indication.

Another embodiment addresses a computer readable non-transitory medium encoded with computer readable program data and code. A counter is incremented for each write operation to a cache. A line affected by a current write operation which caused the counter to meet a threshold is evicted from the cache. The current write to the line affected by the current write operation is stopped due to the counter meeting the threshold.

A further embodiment addresses apparatus for wear-leveling a cache. Means is utilized for writing data to a cache having a plurality of ways coupled to a processor complex. Means is utilized for counting write operations to the cache and generating an indication when the counter has reached a threshold. Means is utilized for evicting from the cache a line affected by the current write operation in response to the indication. Means is utilized for stopping updates to change a current line replacement policy pointer in response to the indication.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well known structures and components are shown in block diagram form in order to avoid obscuring the concepts of the present invention.

Figure 1:
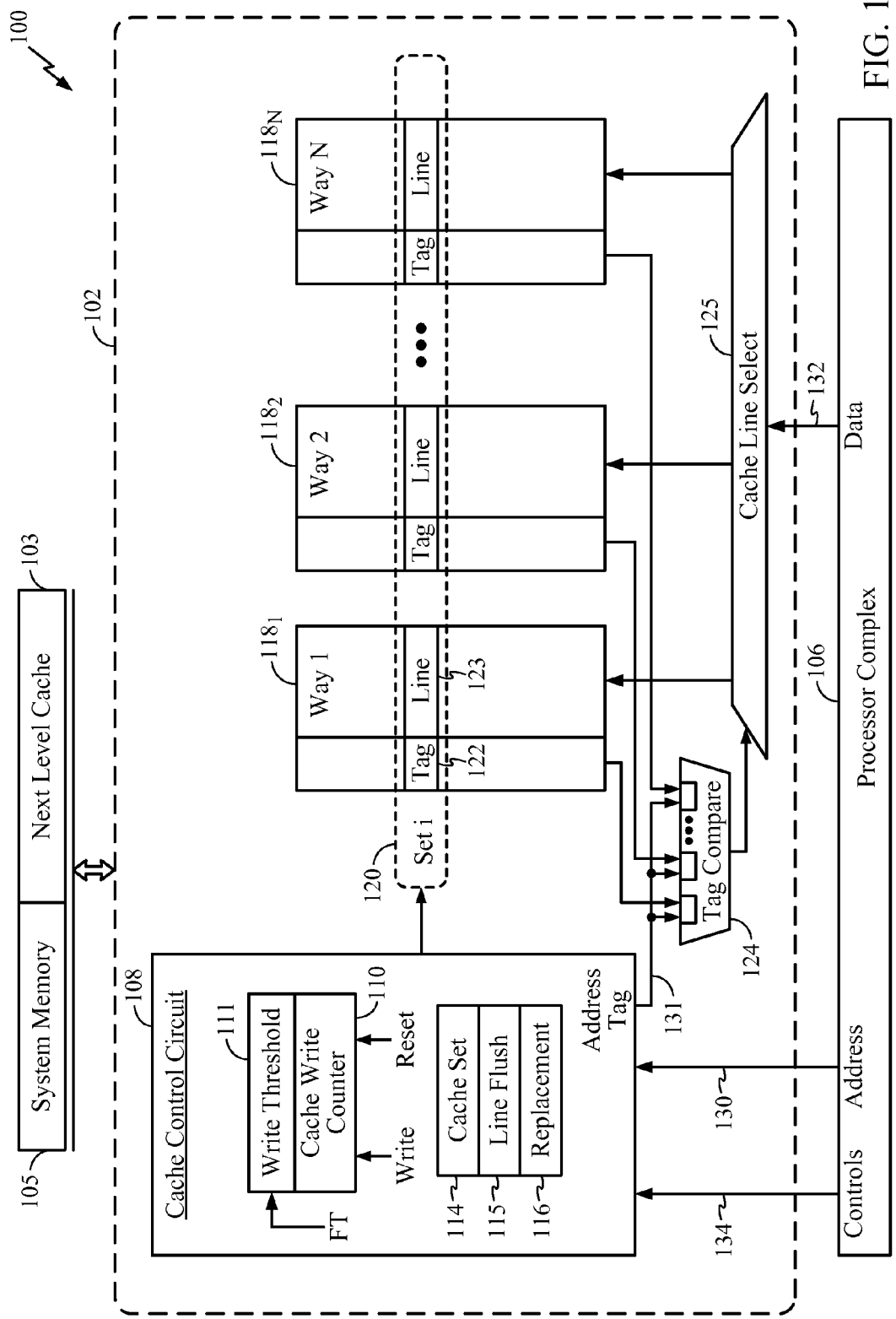
FIG. 1 illustrates an exemplary cache system in which an embodiment of the invention may be advantageously employed.

FIG. 1 illustrates an exemplary memory system 100 in which an embodiment of the invention may be advantageously employed. The memory system 100 includes a cache 102, for example a data cache, a next level cache 103, a system memory 105, and a processor complex 106. The system memory 105 provides access for instructions and data that are not found in the cache 102 or in the next level cache 103. It is noted that the cache 102 and the next level cache 103 may be integrated with processor complex 106. The system memory 105 may also be integrated with the processor complex 106 or separately coupled to the processor complex 106. The processor complex 106 may include one or more processors, such as a dual or a quad processor system. The cache 102 is illustrated as an N-way set associative cache that is representative of a level 1 data cache and in this case, the next level cache 103 would be a level 2 (L2) cache. It is noted that the wear-leveling techniques described herein are also applicable to an L2 cache and a level 3 (L3) cache depending on the type of memory used at each level of the memory hierarchy. The system memory 105 generally experiences a different form of wear-leveling than that experienced in caches. The cache 102 comprises a cache control circuit 108 having a cache write counter 110, a write threshold circuit 111, an address tag selector circuit 114, a line flush circuit 115, and a replacement policy circuit 116 for implementing wear-leveling in the cache 102. The cache 102 also comprises way 1 $118_1$, way 2 $118_2$, ..., way N $118_N$. Each way is configured with sets such as set i 120 comprising a tag 122 and line 123 in way 1 $118_1$ and each way $118_2$ ... $118_N$ is similarly configured.

A technique for wear-leveling of caches addresses unbalanced write traffic on cache lines which cause heavily written cache lines to fail much fast than other lines in the cache. It is also noted that write traffic to blocks of memory in a bulk memory, such as system memory 105 having limited write endurance, may also be unbalanced and cause heavily written memory blocks to fail sooner than other memory blocks in the bulk memory. To address this problem of wear-leveling in caches with limited write endurance, means are provided to count write operations to the cache and generate an indication when a write threshold has been reached. For example, the cache write counter 110 is configured to increment a count for every cache write operation under control of the cache control circuit 108. Upon reaching or exceeding a write count threshold, also referred to as a line-flush threshold (FT), the cache line under the current write operation is evicted, for example by means to flush the line from the cache such as provided by the line flush circuit 115. Generally, a line is flushed from a cache when the line is indicated to be a least recently used (LRU) line and thus is available to be rewritten. In the case of reaching the FT, means are provided to stop an update to a cache line replacement operation for this current write operation. The cache write counter 110 is then reset to initialize the counter in preparation for the next cache write monitoring period. The evicted cache line is written to the next level cache and whenever that cache line is accessed again it is reloaded into a line in the cache based on the replacement policy which indicates a cache line different from the line it was evicted from.

In particular, when a cache line is evicted from the lower level cache, that cache line is marked invalid indicating that the invalid line can be filled with new content. A cache line may be marked invalid by setting a valid bit to an invalid state in the tag associated with the cache line. A cache line that is evicted in standard operations is generally identified by the replacement policy, such as a least recently used (LRU) policy, to be available to be rewritten. After invalidation, it is possible for a cache line that is used frequently, to have the frequently used cache line be rewritten on a subsequent miss on the same cache line. To avoid this rewriting problem for evicted cache lines, when the cache write counter has reached or exceeded the count threshold, an update to a current line replacement policy pointer is blocked and the pointer is not updated. Since the replacement policy pointer is not updated, the current LRU pointer, for example, points to a different line than was evicted. Thus, the cache line that was evicted remains empty until that line really becomes least recently used.

For example in FIG. 1, with the cache 102 configured for a write operation, the processor complex 106 issues an address 130 to the cache 102. In response to the write operation an address tag 131 is generated and compared in tag compare circuit 124 to the tags in each way, such as tag 122 in way 1 $118_1$. If a tag compare matches, the tag compare circuit 124 causes a cache line select circuit 125 to select a path to a way, such as associated with line 123 in way 1 $118_1$ and data 132 is written to the selected line 123. A dirty bit may also be written to the tag 122 indicating data in the line 123 has been modified. For each write operation, the cache write counter 110 is incremented. A write operation may be determined and the cache write counter incremented by a write signal internal to the cache control circuit 108 that is generated when data is to be written to a particular way and line in the cache. Alternatively, the cache control circuit 108 may use an internal command decode operation to set a bit or internal signal state that indicates whether the commanded operation will cause a write operation or a read operation.

The count value from the cache write counter 110 is compared to a preset threshold, such as FT in the write threshold circuit 111. Upon reaching or exceeding the threshold, the line flush circuit 115 is notified and the cache line for the current write operation is flushed, rather than writing the data to the selected line. The evicted line, such as the line 123 in way 1 $118_1$ is written to the next level cache 103, such as an L2 cache if the cache 102 is a level 1 data cache. In an alternative embodiment, the evicted line is written to an L3 cache if the cache 102 is an L2 cache and the processor complex 106 includes a level 1 data cache. The replacement policy circuit 116 is also notified and the replacement policy, such as least recently used (LRU) is not updated. At a later time when the evicted cache line 123 is rewritten to the cache 102, the cache control circuit 108 ensures that the evicted cache line 123 is written to a different location in set i 120, such as a line in one of the other ways, way 2 $118_2$ through way N $118_N$.

The more frequently a program writes to a cache line, the more likely that cache line will be selected when the cache write counter saturates by reaching or exceeding a preset threshold value. Over an operating period, this wear-leveling technique is probabilistic, evicts hotspot cache lines, and relocates these lines to different cache locations providing a significant degree of wear-leveling across the cache array. Thus, by using a global counter of cache write accesses a significant degree of wear-leveling is achieved at a low cost without requiring a costly monitoring of each cache line. Also, by allowing the write count threshold to be settable, a dynamic adjustment of the threshold can be made depending on the operating program. A smaller write count threshold results in a higher frequency of line invalidations, thus the threshold can be dynamically tuned to provide a more balanced intra-set write distribution that is adaptable to a particular program or set of programs. For example, when a new program is executed that has an increased number of hotspots in a cache compared to a previous operating program, the write counter threshold for that cache is reduced to improve the odds of reducing write operations to the hotspots and thereby improve the wear endurance of that cache.

In an alternative embodiment, rather than marking the evicted cache line invalid and blocking an update to the replacement policy due to the evicted line, an additional bit may be added to each cache line's tag which indicates this cache line is a probabilistic invalidated line and reuse of the evicted line should be delayed. A replacement policy, such as LRU, will select a different line for eviction if the selected LRU line has this bit set. The probabilistic invalidated line bit may be reset after a predetermined number of successful cache line write operations to that cache set or reset after a predetermined time period under control of a timer, for example.

The cache unit 102, as a stand-alone cache chip or fixed-integrated module, may receive controls 134 to load a threshold value to the write threshold circuit 111. The controls 134 may include a serial input path that is used to load the threshold value on initialization or at a time determined by a program operating on the processor complex 106. The threshold value could initially be a default threshold value hardcoded on the chip or fixed-integrated module. Then, the default threshold value as loaded in the write threshold circuit 111 may be adjusted according to the program in operation. In an alternative embodiment, monitors, such as a performance drop monitor or a wear effectiveness monitor are implemented in hardware external of the cache 102 or in software coded in a program that operates on the processor complex 106. The internal cache control circuit 108 then receives a signal from one or more such monitors that indicates a threshold value in the write threshold circuit 111 should be increased, decreased, or allowed to stay the same as previously set.

Figure 2:
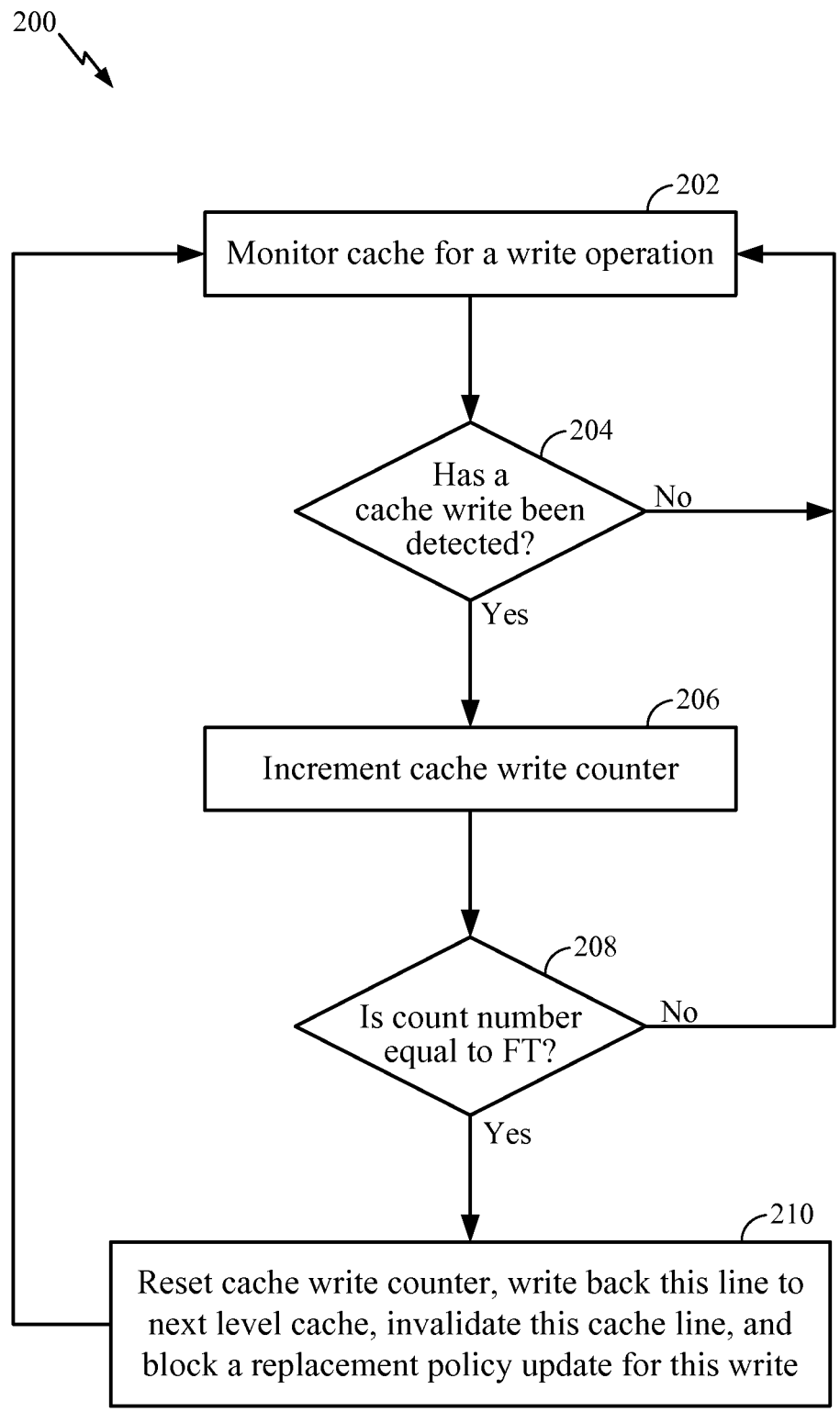
FIG. 2 illustrates an advantageous process for wear-leveling.

FIG. 2 illustrates an advantageous process 200 for wear-leveling. At block 202, cache operations are monitored for a write operation. At decision block 204, a determination is made whether a cache write has been detected. A cache write operation may be determined, for example, in the cache control circuit 108 of FIG. 1. If no cache write operation has been identified, the process 200 returns to block 202. If a cache write operation has been identified, then the process 200 proceeds to block 206. At block 206, the cache write counter is incremented. At block 208, a determination is made whether the count value in the cache write counter is equal to or in an alternate embodiment has exceeded a preset threshold (FT). If it is determined that the count value is not equal to or has not exceeded the preset threshold FT, the process 200 returns to block 202. If the count value is equal to or has exceeded the preset threshold FT, the process 200 proceeds to block 210. At block 210, the cache write counter is reset, the line that would have been written to the monitored cache is instead written to the next level cache, the line in the monitored cache is invalidated, and a replacement policy update is blocked for this write. The process 200 returns to block 202.

Figure 3:
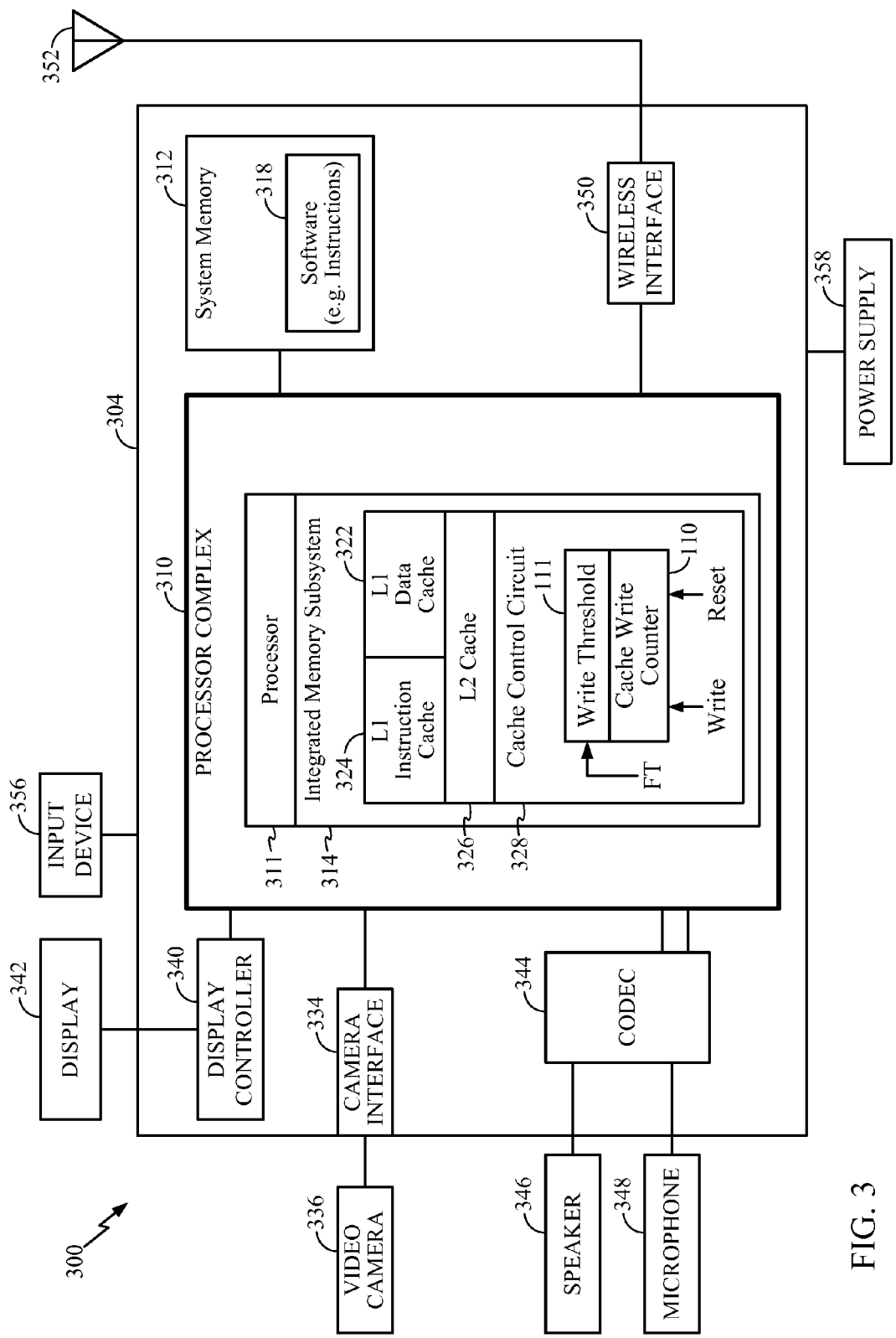
FIG. 3 illustrates a particular embodiment of a portable device having a processor complex that is configured to extend wear endurance in the portable devices memory system.

FIG. 3 illustrates a particular embodiment of a device 300 having a cache controller circuit 328 that is configured to extend the usable lifetime of the memories having limited wear endurance in the memory system of the device 300. The device 300 may be a wireless electronic portable device and include the processor complex 310 coupled to a system memory 312 having software instructions 318. The system memory 312 may include the system memory 105 of FIG. 1. The processor complex 310 may include a processor 311, an integrated memory subsystem 314 having a level 1 data cache (L1 Dcache) 322, a level 1 instruction cache (L1 Icache) 324, and the cache controller circuit 328. The processor complex 310 may include the processor complex 106 of FIG. 1. The integrated memory subsystem 314 may also include a level 2 (L2) unified cache 326. The L1 Dcache 322 may include the cache 102 of FIG. 1 and the L2 unified cache 326 may include the next level cache 103 of FIG. 1, each of which may have limited wear endurance.

The integrated memory subsystem 314 may be included in the processor complex 310 or may be implemented as one or more separate devices or circuitry (not shown) external to the processor complex 310. In an illustrative example, the processor complex 310 operates according to the software instructions 318 and in accordance with any of the embodiments illustrated in or associated with FIGS. 1 and 2. For example, as shown in FIG. 3, the L1 Icache 326, the L1 Dcache 322, and the cache controller circuit 328 are accessible within the processor complex 310, and the processor 311 is configured to access data or program instructions stored in the memories of the integrated memory subsystem 314 or in the system memory 312.

A camera interface 334 is coupled to the processor complex 310 and also coupled to a camera, such as a video camera 336. A display controller 340 is coupled to the processor complex 310 and to a display device 342. A coder/decoder (CODEC) 344 may also be coupled to the processor complex 310. A speaker 346 and a microphone 348 may be coupled to the CODEC 344. A wireless interface 350 may be coupled to the processor complex 310 and to a wireless antenna 352 such that wireless data received via the antenna 352 and wireless interface 350 can be provided to the dual processor 311.

The processor 311 may be configured to execute software instructions 318 accessed from the system memory 312 and stored in a non-transitory computer-readable medium that are executable to cause a computer, such as the processor 311, to execute a program, such as the process 200 of FIG. 2. The software instructions 318 are further executable to cause the processor 311 to process instructions that read and write access the memories of the integrated memory subsystem 314 and the system memory 312.

In a particular embodiment, the processor complex 310, the display controller 340, the system memory 312, the CODEC 344, the wireless interface 350, and the camera interface 334 are included in a system-in-package or system-on-chip device 304. In a particular embodiment, an input device 356 and a power supply 358 are coupled to the system-on-chip device 304. Moreover, in a particular embodiment, as illustrated in FIG. 3, the display device 342, the input device 356, the speaker 346, the microphone 348, the wireless antenna 352, the video camera 336, and the power supply 358 are external to the system-on-chip device 304. However, each of the display device 342, the input device 356, the speaker 346, the microphone 348, the wireless antenna 352, the video camera 336, and the power supply 358 can be coupled to a component of the system-on-chip device 304, such as an associated interface or controller.

The device 300 in accordance with embodiments described herein may be incorporated in a variety of electronic devices, such as a set top box, an entertainment unit, a navigation device, a communications device, a personal digital assistant (PDA), a fixed location data unit, a mobile location data unit, a mobile phone, a cellular phone, a computer, a portable computer, tablets, a monitor, a computer monitor, a television, a tuner, a radio, a satellite radio, a music player, a digital music player, a portable music player, a video player, a digital video player, a digital video disc (DVD) player, a portable digital video player, any other device that stores or retrieves data or computer instructions, or any combination thereof.

The various illustrative logical blocks, modules, circuits, elements, or components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. The processor 311 may be a general purpose processor, or in the alternative, the processor 311 may be a combination of a conventional processor, a digital signal processor, a microcontroller, or a state machine. The processor 311 may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. A non-transitory storage medium may be coupled to the processor such that the processor can read information from, and write information to, the non-transitory storage medium. In the alternative, the non-transitory storage medium may be integral to the processor.

The processor complex 106 of FIG. 1 or the processor 311 of FIG. 3, for example, may be configured to execute instructions including instructions selected from a wear-leveling program stored on a computer readable non-transitory storage medium either directly associated locally with the processor 311, such as may be available through an instruction cache, or accessible through input device 356 or through the wireless interface 350. The input device 356 or the wireless interface 350 also may access data residing in a memory device either directly associated locally with the processor, such as the L1 Icache 324, the L1 Dcache 322, the L2 cache 326 or accessible from another processor's memory. The computer readable non-transitory storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable non-transitory storage medium.

While the invention is disclosed in the context of illustrative embodiments for use in processor systems, it will be recognized that a wide variety of implementations may be employed by persons of ordinary skill in the art consistent with the above discussion and the claims which follow below. For example, a fixed function implementation may also utilize various embodiments of the present invention.

What is claimed is:

1. A method for wear-leveling of a cache, the method comprising:
   incrementing a global counter for each write operation in the cache;
   evicting from the cache a line of data corresponding to a current write operation to a cache line which caused the global counter to meet a threshold; and
   in response to the global counter meeting the threshold:
   writing the line of data to a next level cache,
   resetting the global counter, and
   leaving the evicted cache line empty until it becomes a least recently used cache line.

2. The method of claim 1, wherein the threshold is a program settable value that is compared to the count value output of the global counter which provides an indication when the count value matches the threshold.

3. The method of claim 1, wherein the line of data when next accessed is written to a cache line in the cache that is different from the cache line it was previously evicted from.

4. The method of claim 1, wherein the line of data is selected from a way of an addressed set of ways in the cache and the line of data when next accessed is written to a cache line different from the cache line that the line of data was evicted from in the addressed set of ways.

5. The method of claim 1 further comprising:
   resetting the global counter to initialize the global counter in preparation for a succeeding cache write monitoring period.

6. The method of claim 1 wherein the cache is a level 1 cache and the next level cache is a level 2 cache.

7. The method of claim 1 wherein the cache is a level 2 cache and the next level cache is a level 3 cache.

8. The method of claim 1 further comprising:
   marking the line of data affected by the current write operation which caused the global counter to meet the threshold invalid, wherein the invalid mark causes the line of data to be evicted from the cache.

9. An apparatus for wear-leveling a cache, the apparatus comprising:
   a cache having a plurality of ways coupled to a processor complex which controls write operations to write data to the cache;
   a write threshold circuit and a global counter circuit configured to count each write operation to the cache and to generate an indication when the global counter circuit has reached a threshold based on a comparison of a global counter output of the global counter circuit with a threshold value;

a line flush circuit configured to evict from the cache a line of data corresponding to a current write operation to a cache line in response to the indication, and to write the line of data to a next level cache; and a replacement policy circuit configured to leave the evicted cache line empty until it becomes a least recently used cache line in response to the indication.

10. The apparatus of claim 9, wherein the threshold value is a program settable value that is compared to the global count value output of the global counter circuit which provides the indication when the global count value matches the threshold.

11. The apparatus of claim 10, wherein the threshold value is a default value that is stored in the write threshold circuit and adjusted according to a program in operation.

12. The apparatus of claim 10, wherein the line of data when next accessed is written to a cache line that is different from the cache line it was previously evicted from.

13. The apparatus of claim 10, wherein the line of data is selected from a way of an addressed set of ways in the cache and the line of data when next accessed is written to a cache line in the addressed set of ways different from the cache line that the line of data was evicted from.

14. The apparatus of claim 10, wherein the global counter circuit is reset to initialize the global counter in preparation for a succeeding cache write monitoring period.

15. The apparatus of claim 10 further comprising:

a level 1 cache configured as the cache; and a level 2 cache configured as the next level cache, wherein the line of data is written to the level 2 cache.

16. The apparatus of claim 10 further comprising:

a level 2 cache configured as the cache; and a level 3 cache configured as the next level cache, wherein the line of data is written to the level 3 cache.

17. The apparatus of claim 10, wherein an invalidated line bit is included in each cache line's tag to indicate in response to the indication that the line of data is a probabilistic invalidated line of data and reuse of the line of data should be delayed.

18. A compute readable non-transitory medium encoded with computer readable program data and code, the program data and code when executed operable to:

increment a global counter for each write operation to a cache;

evict from the cache a line of data corresponding to a current write operation to a cache line which caused the global counter to meet a threshold; and in response to the global counter meeting the threshold:
writing the line of data to a next level cache,
resetting the global counter, and
leaving the evicted cache line empty until it becomes a least recently used cache line.

19. An apparatus for wear-leveling a cache, the apparatus comprising:

means for writing data to a cache having a plurality of ways coupled to a processor complex;

means for counting each write operation to the cache and generating an indication an indication when a global counter has reached a threshold value;

means for evicting from the cache a line of data corresponding to a current write operation in response to the indication, and writing the line of data to a next level cache; and means for leaving the evicted cache line empty until it becomes a least recently used cache line in response to the indication.

* * * * *